United States Patent
Ma et al.

(10) Patent No.: US 11,853,229 B2
(45) Date of Patent: Dec. 26, 2023

(54) METHOD AND APPARATUS FOR UPDATING CACHED INFORMATION, DEVICE, AND MEDIUM

(71) Applicant: GUIZHOU BAISHANCLOUD TECHNOLOGY CO., LTD., Guiyang (CN)

(72) Inventors: Shi Ma, Guiyang (CN); Xiaozhong Chen, Guiyang (CN); Yijun Li, Guiyang (CN)

(73) Assignee: GUIZHOU BAISHANCLOUD TECHNOLOGY CO., LTD., Guiyang (CN)

( * ) Notice: Subject to any disclaimer, the term of this patent is extended or adjusted under 35 U.S.C. 154(b) by 0 days.

(21) Appl. No.: 17/637,758

(22) PCT Filed: Aug. 26, 2020

(86) PCT No.: PCT/CN2020/111441
§ 371 (c)(1),
(2) Date: Feb. 23, 2022

(87) PCT Pub. No.: WO2021/037072
PCT Pub. Date: Mar. 4, 2021

(65) Prior Publication Data
US 2022/0283957 A1  Sep. 8, 2022

(30) Foreign Application Priority Data

Aug. 30, 2019 (CN) .......................... 201910818157.8

(51) Int. Cl.
G06F 12/128 (2016.01)
G06F 12/0815 (2016.01)
G06F 12/126 (2016.01)

(52) U.S. Cl.
CPC ........ *G06F 12/128* (2013.01); *G06F 12/0815* (2013.01); *G06F 12/126* (2013.01)

(58) Field of Classification Search
CPC .. G06F 12/0815; G06F 12/126; G06F 12/128; H04L 63/20; H04L 65/40; H04L 67/55; H04L 67/568; H04L 67/5682
See application file for complete search history.

(56) References Cited

U.S. PATENT DOCUMENTS 7,389,393 B1 * 6/2008 Karr .................. G06F 3/067
711/156
11,005,717 B2 5/2021 Chen et al.
(Continued)

FOREIGN PATENT DOCUMENTS

CN    102855293 A   1/2013
CN    103236989 A   8/2013
(Continued)

OTHER PUBLICATIONS

The World Intellectual Property Organization (WIPO) International Search Report for PCT /CN2020/111441 dated Dec. 1, 2020 5 Pages.
(Continued)

*Primary Examiner* — Aracelis Ruiz
(74) *Attorney, Agent, or Firm* — ANOVA LAW GROUP, PLLC (57) ABSTRACT

A cached information updating method includes receiving an update request, determining an update processing manner according to a number of pieces of cached information to be updated indicated in the update request, and updating the cached information according to the update processing manner, to update differently according to different numbers of pieces of cached information.

15 Claims, 3 Drawing Sheets

(56) References Cited

U.S. PATENT DOCUMENTS

| | | | | |
|---|---|---|---|---|
| 2003/0218930 A1* | 11/2003 | Lehmann | .......... | G11C 11/40622 |
| | | | | 365/222 |
| 2010/0082622 A1* | 4/2010 | Irie | ......... | G06F 16/48 |
| | | | | 707/E17.014 |
| 2014/0095458 A1* | 4/2014 | Kim | ......... | G06F 16/10 |
| | | | | 707/698 |

FOREIGN PATENT DOCUMENTS

| | | | |
|---|---|---|---|
| CN | 103747484 | A | 4/2014 |
| CN | 105868234 | A | 8/2016 |
| CN | 106844507 | A | 6/2017 |
| CN | 109005056 | A | 12/2018 |
| CN | 109299087 | A | 2/2019 |
| CN | 110069386 | A | 7/2019 |
| EP | 2445149 | A1 | 4/2012 |
| WO | 2016177283 | A1 | 11/2016 |

OTHER PUBLICATIONS

The State Intellectual Property Office of People's Republic of China the First Office Action for CN 201910818157.8 Jul. 21, 2021 14 pages (with translation).

The State Intellectual Property Office of People's Republic of China the Decision of Rejection for CN 201910818157.8 Feb. 15, 2022 9 pages (with translation).

\* cited by examiner

METHOD AND APPARATUS FOR UPDATING CACHED INFORMATION, DEVICE, AND MEDIUM

CROSS-REFERENCE TO RELATED APPLICATIONS

The present application is a national stage entry under 35 U.S.C. § 371 of International Application No. PCT/CN2020/111441, filed on Aug. 26, 2020, which claims priority to Chinese Patent Application No. 201910818157.8, titled "METHOD AND APPARATUS FOR UPDATING CACHED INFORMATION, AND MEDIUM," filed to the State Intellectual Property Office of People's Republic of China on Aug. 30, 2019, which are incorporated herein by reference in their entirety.

The present application claims priority to Chinese Patent Application No. 201910818157.8, titled "METHOD AND APPARATUS FOR UPDATING CACHED INFORMATION, AND MEDIUM," filed to the State Intellectual Property Office of People's Republic of China on Aug. 30, 2019, which is incorporated herein by reference in its entirety.

TECHNICAL FIELD

The present application relates to, but is not limited to, the field of network security, and in particular to a method and an apparatus for updating cached information, a device and a medium.

BACKGROUND

At present, a lot of information (including resources, data, etc.) is cached on a cache server, for example on a cache server of a CDN node, in order to obtain a faster response speed and reduce the return to the origin server. However, after the information is updated, the cached information needs to be updated or deleted in time. Otherwise, the user may access the old content, which may cause unknown risks.

SUMMARY

In order to overcome the problems in related technologies, the present application provides a method and an apparatus for updating cached information, a device and a medium.

According to a first aspect of the present application, a method for updating cached information is provided, comprising:

receiving an update request for cached information, determining an update processing manner according to a number of pieces of cached information to be updated indicated in the update request, and updating the cached information to be updated according to the update processing manner determined.

Wherein the determining an update processing manner according to a number of pieces of cached information to be updated indicated in the update request comprises:

judging whether the cached information to be updated indicated in the update request is batch cached information, judging whether a number of pieces of batch cached information to be updated is greater than a preset threshold if the cached information to be updated indicated in the update request is the batch cached information, determining the update processing manner is a first update processing manner if the number of the pieces of the batch cached information to be updated is greater than the preset threshold, and determining the update processing manner is a second update processing manner if the number of the pieces of the batch cached information to be updated is not greater than the preset threshold.

Wherein the updating the cached information to be updated according to the update processing manner determined comprises:

when the update processing manner is the first update processing manner, recording an update type and an update request time, and at a predetermined time, determining cached information in the batch cached information that has not been updated according to the update type, and updating the cached information according to the update type; or when the update processing manner is the second update processing manner, updating the batch cached information to be updated according to the update type.

Wherein, the method for updating further comprises:
counting the cached information in a specified directory.

Wherein, the method for updating further comprises:
storing the cached information in a multi-level index manner; and
determining the cached information to be updated in the multi-level index manner according to the update request.

Wherein, the method for updating further comprises:
identifying different text formats of same cached information;

before the updating the cached information to be updated according to the update processing manner determined, the method for updating further comprises: based on the identifying, determining the cached information to be updated of all the text formats; and the updating the cached information to be updated according to the update processing manner determined comprises: updating the cached information to be updated of all the text formats.

Wherein, the first update processing manner further comprises:

recording the update type and the update request time in a last update request if a plurality of the update requests for the same batch cached information are received, and at the predetermined time and according to the update type in the last update request, updating the cached information in the batch cached information that has not been updated according to the update type.

According to another aspect of the present application, an apparatus for updating cached information is provided, comprising:

a receiving module, configured to receive an update request for cached information;

a determination module, configured to determine an update processing manner according to a number of pieces of cached information to be updated indicated in the update request; and an update module, configured to update the cached information to be updated according to the update processing manner determined.

Wherein, the determination module is configured to:

judge whether the cached information to be updated indicated in the update request is batch cached information, judge whether a number of pieces of batch cached information to be updated is greater than a preset threshold if the cached information to be updated indicated in the update request is the batch cached information, determine the update processing manner is a first update processing manner if the number of the pieces of the batch cached information to be updated is greater than the preset threshold, and determine the update processing manner is a second update processing manner if the number of the pieces of the batch cached information to be updated is not greater than the preset threshold.

Wherein, the update module is configured to:

when the update processing manner is the first update processing manner, record an update type and an update request time, and at a predetermined time, determine cached information in the batch cached information that has not been updated according to the update type, and update the cached information according to the update type; or when the update processing manner is the second update processing manner, update the batch cached information to be updated according to the update type.

Wherein, the apparatus for updating further comprises:

a storage module, configured to count the cached information in a specified directory.

Wherein, the storage module is further configured to store the cached information in a multi-level index manner; and the update module is further configured to determine the cached information to be updated in the multi-level index manner according to the update request.

Wherein, the apparatus for updating further comprises:

an identification module, configured to identify different text formats of same cached information;

the identification module is further configured to, before the updating the cached information to be updated according to the update processing manner determined, based on the identifying, determine the cached information to be updated of all the text formats; and the update module is further configured to update the cached information to be updated of all the text formats.

Wherein, the update module is further configured to:

when the update processing manner is the first update processing manner, record the update type and the update request time in a last update request if a plurality of the update requests for the same batch cached information are received, and at the predetermined time and according to the update type in the last update request, update the cached information in the batch cached information that has not been updated according to the update type.

According to still another aspect of the present application, there is provided a computer-readable storage medium having a computer program stored therein, when executed by a processor, the computer program implements steps of the method.

According to yet another aspect of the present application, there is provided a computer device, comprising a memory, a processor, and a computer program stored in the memory and capable of running on the processor, when executing the computer program, the processor implements steps of the method.

The method and the apparatus for processing cached information according to the present application can achieve the following beneficial effects:

1) The cached information can be processed timely, while reducing the pressure of returning to the origin server as much as possible and also ensuring that the cache service may be carried out stably and normally.

2) by the batch processing, different processing manners are used according to the number of pieces of cached information. In this way, the cached information may be processed as needed and the efficiency is improved.

3) The cached information is cached in a multi-level index manner, so that it is convenient to look up the cached information during the processing and pushing and then process and push the cached information. There is no need to look up all cached information by traversing them and then process and push as in the traditional method.

4) By marking the same cached information of different text formats, the storage states of different versions of the same cached information are identified, for example, the compressed version and the uncompressed version are identified, so that the same cached information of all different text formats is processed and pushed.

BRIEF DESCRIPTION OF THE DRAWINGS

The accompanying drawings illustrated herein, which constitute part of the present application, are used to provide further understanding of the present application, and exemplary embodiments of the present application and the description thereof are used to explain the present application and not intended to inappropriately limit the present application. In the drawings.

DETAILED DESCRIPTION

The technical solutions in the embodiments of the present application will be described clearly and completely with reference to the accompanying drawings in the embodiments of the present application. Apparently, the embodiments to be described are some embodiments of the present application, rather than all embodiments of the present application. Based on the embodiments of the present application, all other embodiments obtained by a person of ordinary skill in the art without paying any creative effort are included in the protection scope of the present application. It should be noted that the embodiments of the present application and features in the embodiments may be combined if not conflict.

The present application provides a method for processing cached information, comprising: receiving an update request for cached information; determining, according to the update request, whether a preset update manner in the update request is a batch update manner; determining an update processing manner according to the number of pieces of batch cached information to be updated, if the preset update manner in the update request is the batch update manner; updating the batch cached information to be updated according to the update processing manner determined. The present application further provides an apparatus corresponding to the method for updating cached information. In the present application, by this method, different processing manners may be used according to the number of pieces of batch cached information, the pressure of returning to the origin server is reduced as much as possible and the cache service may also be carried out stably and normally.

The method for updating cached information according to the present application will be described in detail below with reference to the accompanying drawings.

Figure 1:
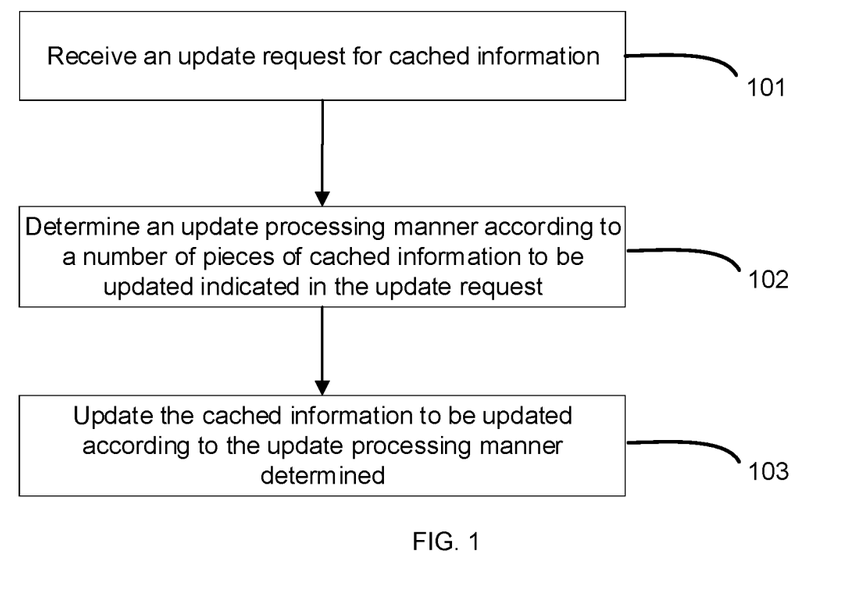
FIG. 1 shows a method for updating cached information according to an exemplary embodiment.

In an embodiment of the present application, a method for updating cached information is provided, which may be applied to a cache server. As shown in FIG. 1, a method for updating cached information according to an exemplary embodiment is illustrated, comprising:

S101: Receive an update request for cached information.

The cache server receives an update request from an update request sending side, for example, receives an update request from an origin server.

S102: Determine an update processing manner according to a number of pieces of cached information to be updated indicated in the update request.

Wherein, the cached information may be information in any desired form, and may be stored in a desired manner. For example, the cached information may be metadata of related resources, and the metadata is stored on a disk.

Different update processing manners may be used for the different numbers of pieces of cached information to be updated. After receiving the update request, the cache server determines whether the cached information to be updated indicated in the update request is batch cached information. If the cached information to be updated indicated in the update request is batch cached information, it determines whether the number of pieces of batch cached information to be updated is greater than a predetermined threshold. If the number of pieces of batch cached information to be updated is greater than the predetermined threshold, the first update processing manner may be used. If the number of pieces of batch cached information to be updated is not greater than the predetermined threshold, the second update processing manner may be used.

S103: Update the cached information to be updated according to the update processing manner determined.

when the update processing manner is the first update processing manner, update type and update request time are recorded, and at predetermined time, cached information in the batch cached information which has not been updated according to the update type is determined and is updated according to the update type; or when the update processing manner is the second update processing manner, the batch cached information to be updated is updated according to the update type.

The update processing manners for updating batch cached information may comprise:
a. expiring the batch cached information in the specified directory mandatorily; and
b. deleting the batch cached information in the specified directory.

In order to reduce the processing pressure of the cache server, for the cache information to be updated indicated in the update request, a determination will be made as to, according to the number of pieces of cached information, whether to process the update request once receiving it or to process it at predetermined time. When the cache server receives the update request, it may judge whether the update request is a batch cached information update request, that is, whether there are multiple pieces of cached information to be updated. If there are multiple pieces of cached information to be updated, it is batch cached information. A predetermined threshold is set for the number of pieces of batch cached information in each specified directory, and the cache server will record the number of pieces of batch cache data in the specified directory in real time. When an update request for batch cached information in a specified directory is received, first, a determination is made as to whether the number of pieces of batch cached information in the specified directory exceeds its predetermined threshold. If the number of pieces of batch cached information in the specified directory exceeds its predetermined threshold, the first update processing manner is used. That is, the batch cached information will be updated at predetermined time, instead of updating the batch cached information once receiving the update request for batch cached information in the specified directory. For example, the batch cached information may be updated before dawn when the load is low. When the batch cached information is updated at predetermined time, first, cached information which has been updated according to the update type and cached information which has not been updated according to the update type are determined. And, the cached information which has not been updated is updated according to the update type. If the number of pieces of batch cached information in the specified directory does not exceed its predetermined threshold, the batch cached information in the specified directory is processed in batch. If the received update request is for the cached information of a single file, the cache server updates the cached information of the single file when receiving the update request.

In the first update processing manner, the cache server may record the update type and update request time in the update request in the form of a record table, and record the batch cached information to be updated in the form of rule expressions, for example, record the batch cached information to be updated in the form of regular expressions. In this way, it is convenient for the cache database to find all cached information to be updated when processing the update request, thereby saving the processing time and reducing the pressure of the database.

In the first update processing manner, if multiple update tasks are submitted for the same batch cached information before the predetermined time, the cache server regards the last update request as the final update task and records the time when the update request is received. For example, the origin server sends a task of delete *.png batch cached files in a specified directory to the cache server, and before the predetermined time, sends a task of expire the *.png batch cached information in the specified directory to the cache server, that is, the same batch cached information needs to be expired mandatorily. The cache server records the task of processing the batch cached information as expiring the batch cached information, and records the time when the update request of expiring the batch cached information is received.

In the first update manner, the cache server may record the update type and update request time in the update request in the form of a record table, and record the batch cached information to be updated in the form of rule expressions, for example, record the batch cached information to be updated in the form of regular expressions. In this way, it is convenient for the cache database to find all cached information to be updated when processing the update request, thereby saving the processing time and reducing the pressure of the database.

In the first update manner, if multiple update tasks are submitted for the same batch cached information before the predetermined time, the cache server regards the last update request as the final update task and records the time when the update request is received. For example, the origin server sends a task of delete *.png batch cached files in a specified directory to the cache server, and before the predetermined time, sends a task of expire the *.png batch cached information in the specified directory to the cache server, that is, the same batch cached information needs to be expired mandatorily. The cache server records the task of processing the batch cached information as expiring the batch cached information, and records the time when the update request of expiring the batch cached information is received.

In the present application, for the cached information cached in the cache database, the cache database counts that the batch cached information in a specified directory in real time according to different specified directories. When receiving an update request for batch cached information in a certain specified directory, the real-time count is compared with a preset threshold. Different processing manners are used according to the comparison result.

By such a processing manner, the cached information may be updated in batch efficiently and quickly, thereby reducing the pressure of returning to the origin server as much as possible and also ensuring that the cache service may be carried out stably and normally, which is the object of the present application. For batch update resources, according to the number of batch update resources, different policies are used, which is more practical and efficient. For example, for a scenario where there is a small number of cached information in a specified directory, that is, when the number of pieces of cached information is less than a preset threshold, the batch cached information may be updated directly, without maintaining the update request in the form of a record table, and when the batch cached information is to be updated, it is unnecessary to look up the record table. In this way, looking up the record table and judging the update type and update request time are reduced, and the batch cached information in the corresponding specified directory may be found directly from the cached information table and then updated, it is convenient and simple. In addition, for a scenario where there is a small number of cached information in a specified directory, that is, when the number of pieces of cached information is less than a preset threshold, the batch cached information in the specified directory may be found directly from the cached information table and then updated, this can ensure that the normal service of the cache is not affected, meanwhile, the returning of a small number of batch cached information to the origin server will not have great impact on the origin server. Under such a premise, the batch update task may be completed quickly, it is unnecessary to wait for the predetermined time for batch processing, and the pressure of processing the batch cached information at the predetermined time is reduced.

Figure 2:
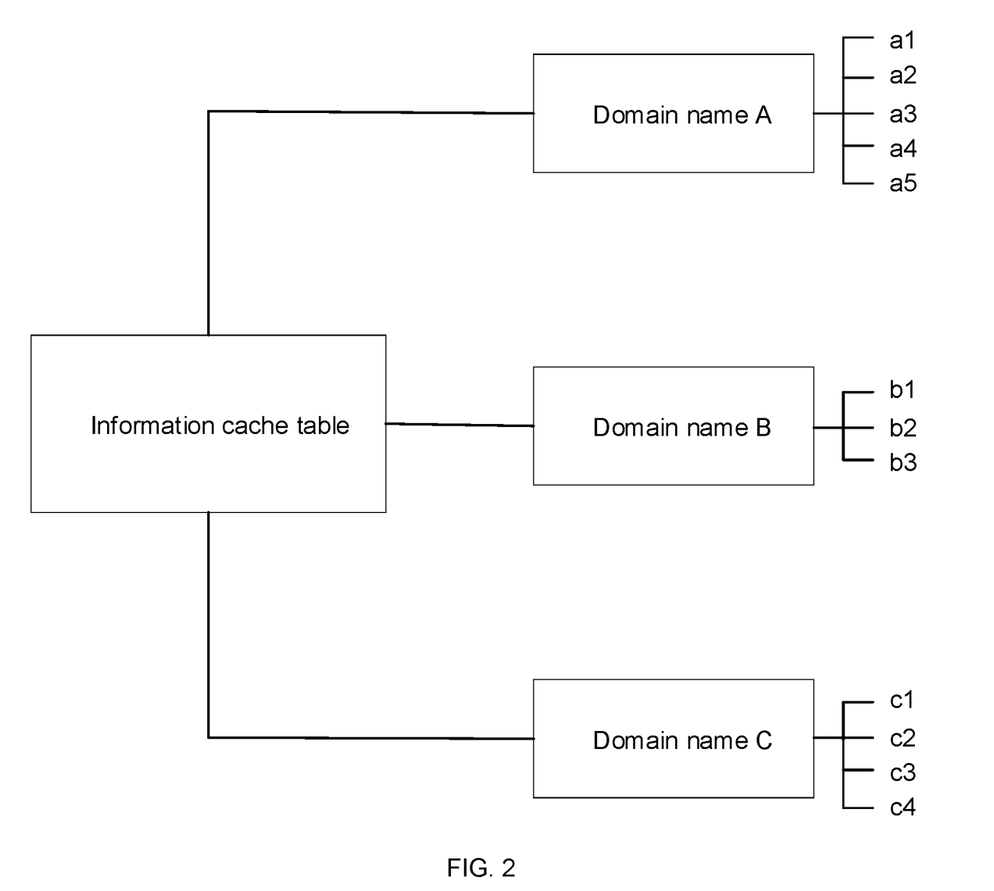
FIG. 2 shows a storage method using a domain name as an index according to an exemplary embodiment.

The method for updating cached information according to the present application may further comprise: storing the cached information in a multi-level index manner in the cache server. For example, the domain name may be used as the parent directory, and the corresponding cached information under the domain name may be correspondingly stored in the index subdirectory. As shown in FIG. 2, a storage method using the domain name as the index is exemplarily shown. The domain name A corresponds to five pieces of cached information a1, a2, a3, a4 and a5, which are correspondingly stored in the directory for the domain name A. The domain name B corresponds to three pieces of cached information b1, b2, and b3, which are correspondingly stored in the directory for the domain name B. The domain name C corresponds to four pieces of cached information c1, c2, c3 and c4, which are correspondingly stored in the directory for the domain name C.

When the step 104 is performed, the batch cached information to be updated may be determined by means of a multi-level index manner. For example, in the update request, the batch cached information c1, c2, c3, and c4 need to be updated, it may be determined that the batch cached information c1, c2, c3, and c4 are stored in the directory for the domain name C, the querying may be directly performed in the directory for the domain name C, and then the batch cached information in the directory for the domain name C is determined.

The cached information is cached in a multi-level index manner, so that it is convenient to look up the cached information during the processing and pushing and then process and push the cached information. There is no need to look up all cached information by traversing them and process as in the traditional method.

The method for updating cached information according to the present application may further comprise: identifying different text formats of the same cached information. The identification method may be set according to actual needs, for example, different text formats of the same cached information are identified by strings with the same first bit, for example, the compressed version of certain cached information is identified by 1a, and the non-compressed version of the cached information is identified by 1b.

Before processing the cached information according to the update manner determined, it is possible to determine all text formats of the cached information to be processed by identifiers. For example, if the compressed version of the cached information c1 to be processed is identified by 1a and the non-compressed version is identified by 1b, then it may be determined, according to the identifiers, that the cached information c1 to be updated comprises two text formats: a compressed version and a non-compressed version. When processing the cached information according to the determined processing manner, the cached information c1 of both of the two text formats is processed.

By marking different text formats of the same cached information, the storage states of different versions of the same cached information are identified, for example, the compressed version and the uncompressed version are identified, it is convenient to process the same cached information of all different text formats at the same time when processing and pushing.

The technical solutions of the present application will be detailed below by a specific example.

In a specified directory a.com of the cache server, there are three files 1.png, 2.png, and 3.png. The latest processing time is 10:00 a.m. on Aug. 9, 2019.

The origin server sends a request to expire all .png files in the specified directory a.com to the cache server at 13:00 on Aug. 10, 2019. After receiving the expiration request, the cache server judges that the update request is a batch expiration request, and judges whether the number of pieces of the batch cached information is greater than a preset threshold. There are three pieces of batch cached information. If the preset threshold is 2, the number of pieces of batch cached information is greater than the preset threshold. The cache server records that the update type of the batch cached information is batch expiration, and the receiving time TG of the update request is 13:00 on Aug. 10, 2019, and specifies all files ending with .png in the form of regular expressions for batch processing, for example, specifies in the form of *.png. The given time may be any time set by the cache server, for example, before dawn when the load is low.

The origin server again sends, a request to delete the batch cached information in batch to the cache server, that is, to delete all files ending with .png in a.com, at 15:00 on Aug. 10, 2019. The cache server stores the update request, and records the receiving time TG of the update request is 15:00 on Aug. 10, 2019. In this case, the batch update manner for the specified directory is batch deletion.

The client sends an access request to a.com/1.png to the cache server at 16:00 on Aug. 10, 2019. After the cache server receives the access request, it determines that a preset processing manner for the cached information is included in the preset processing manner for deleting the batch cached information mentioned above, and judges whether the update request time of the preset processing manner is later than the latest processing time of the cached information. It is found that the update request time of the preset processing manner at 15:00 on Aug. 9, 2019 is later than the latest processing time of the cached information at 10:00 on Aug. 9, 2019. The cache server deletes the resource, i.e., a.com/1.png, and sends a request to the target server, for example, the origin server, to reacquire the resource, caches the cached information of the resource returned by the target server, and records the latest processing time of the cached data as 16:00 on Aug. 10, 2019. Meanwhile, the updated cached information is pushed to the client.

After the above processing, in the cache server, the latest processing time of a.com/1.png is 16:00 on Aug. 10, 2019, and the latest processing time of a.com/2.png and a.com/3.png is 13:00 on Aug. 10, 2019.

At a given time, at 0:00 a.m. on Aug. 11, 2019, the cache server performs predetermined processing operations on a.com/1.png, a.com/2.png, and a.com/3.png. The cached information which has not been updated according to the update type is determined, and then updated according to the update type. Wherein, a.com/2.png and a.com/3.png have not been updated according to the update type, the cache server deletes the cached information of a.com/2.png and a.com/3.png, to complete the batch deletion request from the origin server.

In another example of the present application, there are three files 1.png, 2.png, and 3.png in the specified directory a.com of the cache server, and the latest processing time is 10:00 a.m. on Aug. 9, 2019.

The origin server sends a request to expire all files in the specified directory a.com to the cache server at 13:00 on Aug. 10, 2019. In the batch expiration request, all files ending with .png are specified in the form of regular expressions for batch processing, for example in the form of *.png. After receiving the update request, the cache server judges whether the number of pieces of the batch cached information is greater than a preset threshold. There are three pieces of batch cached information. If the preset threshold is 5, the number of pieces of batch cached information is less than the preset threshold. The cache server directly finds all the cached information in the specified directory a.com from the cached information table, i.e., the cached information of the three files 1.png, 2.png, and 3.png, and then expires them to complete the batch expiration request from the origin server.

Figure 3:
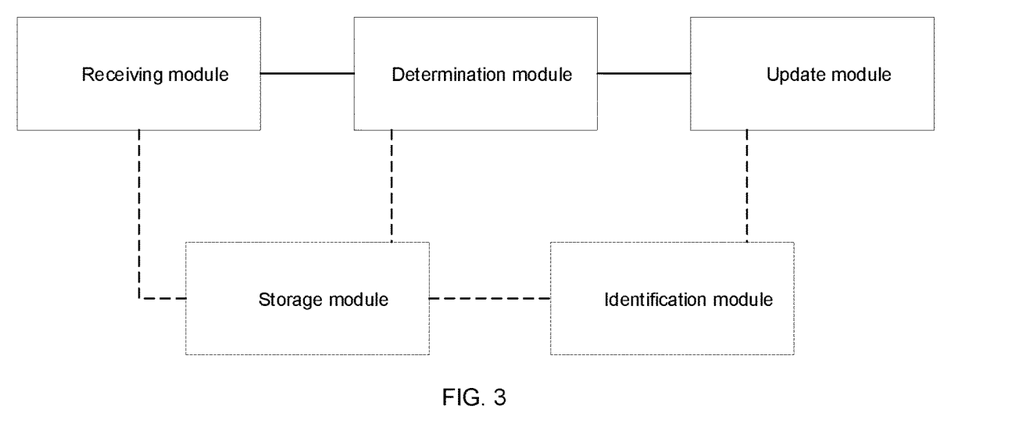
FIG. 3 shows an apparatus for updating cached information according to an exemplary embodiment.

The present application further provides an apparatus for processing cached information. As shown in FIG. 3, an apparatus for updating cached information according to an exemplary embodiment is illustrated, comprising: a receiving module, configured to receive an update request for cached information; a determination module, configured to determine an update processing manner according to the number of pieces of cached information to be updated indicated in the update request; and an update module, configured to update the cached information to be updated according to the update processing manner determined.

The determination module is further configured to judge whether the cached information to be updated indicated in the update request is batch cached information, judge whether the number of pieces of batch cached information to be updated is greater than a preset threshold if the cached information to be updated indicated in the update request is batch cached information, determine that the update processing manner is a first update processing manner if the number of pieces of batch cached information to be updated is greater than the preset threshold, and determine that the update processing manner is a second update processing manner if the number of pieces of batch cached information to be updated is not greater than the preset threshold.

The update module is configured to: when the update processing manner is the first update processing manner, update type and update request time are recorded, and at predetermined time, cached information in the batch cached information that has not been updated according to the update type is determined and the cached information is updated according to the update type; or when the update processing manner is the second update processing manner, the batch cached information to be updated is updated according to the update type.

The update apparatus further comprises a storage module, configured to count the cached information in a specified directory.

The storage module is further configured to store cached information in a multi-level index manner.

The update module is further configured to determine the cached information to be updated in a multi-level index manner according to the update request.

The update apparatus further comprises an identification module, configured to identify different text formats of the same cached information.

The identification module is further configured to, before updating the cached information to be updated according to the update processing manner determined, based on the identifying, determine all text formats of the cached information to be updated by identifiers; and the update module is further configured to update the cached information to be updated of all the text formats.

The update module is further configured to: when the update processing manner is the first update processing manner, record update type and update request time in the last update request if multiple update requests for the same batch cached information are received, and at predetermined time and according to the update type in the last update request, update cached information in the batch cached information that has not been updated according to the update type.

The steps in the method according to the embodiment of the present application may be adjusted in order, combined, and deleted according to actual needs.

The unit modules in the apparatus for updating cached information in the embodiment of the present application may be combined, divided, and deleted according to actual needs.

An embodiment of the present application further provides a computer-readable storage medium comprising a computer program stored therein, when executed, the computer program implements steps of the method for updating cached information described above. The specific implementation involved in the execution of the computer program has been described in detail in the embodiment of the method, and will not be repeated here.

Figure 4:
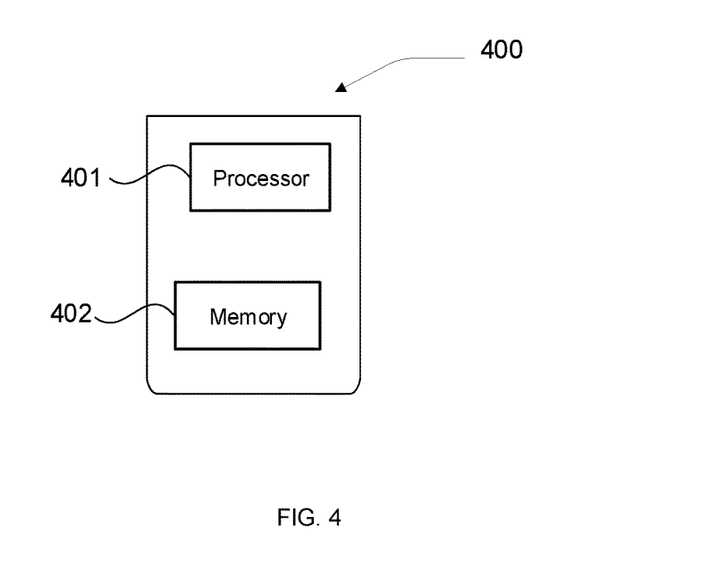
FIG. 4 is a block diagram of a computer device for updating cached information according to an exemplary embodiment.

FIG. 4 is a block diagram of a computer device 400 for updating cached information according to an exemplary embodiment. For example, the computer device 400 may be provided as a server. Referring to FIG. 4, the computer device 400 comprises a processor 401, one or more processors may be provided according to actual needs. The computer device 400 further comprises a memory 402 configured to store instructions executable by the processor 401, for example application programs. One or more memories may be provided according to actual needs. There may be one or more application programs stored in the memory. The processor 401 is configured to execute instructions to perform the method for updating cached information and the method for pushing cached information.

It may be understood by those skilled in the art that the embodiments of the present application may be provided as methods, apparatuses (devices), or computer program products. Therefore, the present application may be in the form of an only hardware embodiment, an only software embodiment, or an embodiment combining software and hardware. Moreover, the present application may be in the form of a computer program product implemented on one or more computer-usable storage media containing computer-usable program codes. The computer storage media comprise volatile and nonvolatile, removable and non-removable media implemented in any method or technology for storing information (for example computer-readable instructions, data structures, program modules, or other data), including but not limited to RAMs, ROMs, EEPROMs, flash memories or other memories, CD-ROMs, digital versatile disks (DVD) or other optical disk storages, magnetic cartridges, magnetic tapes, magnetic disk storages or other magnetic storage devices, or any other media that may be used to store desired information and may be accessed by a computer. In addition, as known to a person of ordinary skill in the art, the communication media usually contain computer-readable instructions, data structures, program modules, or other data in modulated data signals such as carriers or other transmission mechanisms, and may include any information delivery media.

The present application has been described with reference to flowcharts and/or block diagrams of the methods, apparatuses (devices) and computer program products according to embodiments of the present invention. It should be understood that each flow and/or block in the flowchart and/or block diagram and the combination of flows and/or blocks in the flowchart and/or block diagram may be implemented by computer program instructions. These computer program instructions may be provided to the processors of general-purpose computers, special-purpose computers, embedded processors, or other programmable data processing devices to produce a machine, so that the instructions executed by the processors of the computers or other programmable data processing devices produce an apparatus that realizes the functions specified in one or more flows in the flowchart and/or one or more blocks in the block diagram.

These computer program instructions may be stored in computer-readable memories that can direct computers or other programmable data processing devices to work in a specific manner, so that the instructions stored in the computer-readable memories produce an article of manufacture including the instruction apparatus. The instruction apparatus implements the functions specified in one or more flows in the flowchart and/or one or more blocks in the block diagram.

These computer program instructions may be loaded on computers or other programmable data processing devices, so that a series of operating steps are executed on the computers or other programmable devices to produce computer-implemented processing. Thus, the instructions executed on the computers or other programmable devices provide steps for implementing the functions specified in one or more flows in the flowchart and/or one or more blocks in the block diagram.

Herein, terms "comprise," "include" and variants thereof are intended to cover non-exclusive inclusion, so that an article or a device including a series of elements not only includes these elements, but also includes other elements not explicitly listed, or further includes inherent elements of the article or the device. Without further limitation, an element as defined by a statement "including a . . . " is not exclusive of additional identical elements in the article or the device of the element.

Although the preferred embodiments of the present application have been described, those skilled in the art can make additional changes and modifications to these embodiments once they learn the basic creative concept. Therefore, the appended claims are intended to be interpreted as comprising the preferred embodiments and all changes and modifications falling into the scope of the present application.

Apparently, those skilled in the art can make various modifications and variations to the present application without departing from the spirit and scope of the present application. In this way, if these modifications and variations of the present application fall into the scope of the claims of the present application and their equivalents, the present application is intended to encompass these modifications and variations.

INDUSTRIAL APPLICABILITY

The present application provides a method and an apparatus for processing cached information. The method comprises: receiving an update request for cached information; determining, according to the update request, whether a preset update manner in the update request is a batch update manner; determining an update processing manner according to the number of pieces of batch cached information to be updated if the preset update manner in the update request is the batch update manner; updating the batch cached information to be updated according to the update processing manner determined. In the present application, by this method, different processing manners may be used according to the number of pieces of batch cached information, the pressure of returning to the origin server is reduced as much as possible and the cache service may also be carried out stably and normally.

The invention claimed is:

1. A cached information updating method, performed by a cache server, comprising:
   receiving an update request and storing, in the cache server, cached information to be updated indicated in the update request;
   determining an update processing manner according to a number of pieces of the cached information, including:
      judging whether the cached information is batch cached information; and
      in response to the cached information being the batch cached information:

judging whether a number of pieces of the batch cached information is greater than a preset threshold; and determining the update processing manner to be a first update processing manner in response to the number of pieces of the batch cached information being greater than the preset threshold; and updating the cached information according to the update processing manner, to update differently according to different numbers of pieces of cached information, wherein the update processing manner is the first update processing manner, and updating the cached information includes:

recording an update type and an update request time, and at a predetermined time, determining not-yet-updated cached information in the batch cached information that has not been updated according to the update type, and updating the not-yet-updated cached information according to the update type; or recording the update type and the update request time in a last update request in response to receiving a plurality of update requests for the batch cached information, and at the predetermined time and according to the update type in the last update request, updating the not-yet-updated cached information in the batch cached information according to the update type.

2. The method according to claim 1, wherein determining the update processing manner further includes:

determining the update processing manner to be a second update processing manner in response to the number of pieces of the batch cached information being not greater than the preset threshold.

3. The method according to claim 2, wherein:

the update processing manner is the second update processing manner, and updating the cached information includes updating the batch cached information according to the update type.

4. The method according to claim 1, further comprising: counting the cached information in a specified directory.

5. The method according to claim 1, further comprising: storing the cached information in a multi-level index manner; and determining the cached information according to the multi-level index manner based on the update request.

6. The method according to claim 1, further comprising:

marking different text formats of same cached information using different identifiers; and before updating the cached information, determining to-be-updated cached information of all text formats by the identifiers; and updating the cached information includes updating the to-be-updated cached information of all the text formats.

7. A computer-readable storage medium storing a computer program that, when executed by a processor, causes the processor to:

receive an update request and store, in a cache server, cached information to be updated indicated in the update request;

determine an update processing manner according to a number of pieces of the cached information, including:

judging whether the cached information is batch cached information; and in response to the cached information being the batch cached information:

judging whether a number of pieces of the batch cached information is greater than a preset threshold;

determining the update processing manner to be a first update processing manner in response to the number of pieces of the batch cached information being greater than the preset threshold; and update the cached information according to the update processing manner, to update differently according to different numbers of pieces of cached information, wherein the update processing manner is the first update processing manner, and the processor is further configured to execute the computer program to:

record an update type and an update request time, and at a predetermined time, determine not-yet-updated cached information in the batch cached information that has not been updated according to the update type, and update the not-yet-updated cached information according to the update type; or record the update type and the update request time in a last update request in response to receiving a plurality of update requests for the batch cached information, and at the predetermined time and according to the update type in the last update request, update the not-yet-updated cached information in the batch cached information according to the update type.

8. The storage medium according to claim 7, wherein the processor is further configured to execute the computer program to:

determine the update processing manner to be a second update processing manner in response to the number of pieces of the batch cached information being not greater than the preset threshold.

9. The storage medium according to claim 8, wherein:

the update processing manner is the second update processing manner, and the processor is further configured to execute the computer program to update the batch cached information according to the update type.

10. A computer device comprising:

a memory storing a computer program; and a processor configured to execute the computer program to:

receive an update request and store, in a cache server, cached information to be updated indicated in the update request;

determine an update processing manner according to a number of pieces of the cached information, including:

judging whether the cached information is batch cached information; and in response to the cached information being the batch cached information:

judging whether a number of pieces of the batch cached information is greater than a preset threshold;

determining the update processing manner to be a first update processing manner in response to the number of pieces of the batch cached information being greater than the preset threshold; and update the cached information according to the update processing manner, to update differently according to different numbers of pieces of cached information, wherein the update processing manner is the first update processing manner, and the processor is further configured to execute the computer program to:

record an update type and an update request time, and at a predetermined time, determine not-yet-updated cached information in the batch cached information that has not been updated according to the update type, and update the not-yet-updated cached information according to the update type; or record the update type and the update request time in a last update request in response to receiving a plurality of update requests for the batch cached information, and at the predetermined time and according to the update type in the last update request, update the not-yet-updated cached information in the batch cached information according to the update type.

11. The device according to claim 10, wherein the processor is further configured to execute the computer program to:

determine the update processing manner to be a second update processing manner in response to the number of pieces of the batch cached information being not greater than the preset threshold.

12. The device according to claim 11, wherein:

the update processing manner is the second update processing manner; and the processor is further configured to execute the computer program to update the batch cached information according to the update type.

13. The device according to claim 10, wherein the processor is further configured to execute the computer program to:

count the cached information in a specified directory.

14. The device according to claim 10, wherein the processor is further configured to execute the computer program to:

store the cached information in a multi-level index manner; and determine the cached information according to the multi-level index manner based on the update request.

15. The device according to claim 10, wherein the processor is further configured to execute the computer program to:

mark different text formats of same cached information using different identifiers; and before updating the cached information, determine to-be-updated cached information of all text formats by the identifiers; and update the cached information includes updating the to-be-updated cached information of all the text formats.

* * * * *